United States Patent
Mayr et al.

(10) Patent No.: US 8,997,582 B2
(45) Date of Patent: Apr. 7, 2015

(54) METHOD AND APPARATUS FOR DETERMINING FLOW CHARACTERISTICS OF A MEDIUM IN A PIPELINE

(75) Inventors: Andreas Mayr, Lorrach (DE); Volker Dreyer, Lorrach (DE); Sergej Lopatin, Lorrach (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 203 days.

(21) Appl. No.: 13/695,693

(22) PCT Filed: Apr. 14, 2011

(86) PCT No.: PCT/EP2011/055944
§ 371 (c)(1),
(2), (4) Date: Nov. 1, 2012

(87) PCT Pub. No.: WO2011/138147
PCT Pub. Date: Nov. 10, 2011

(65) Prior Publication Data
US 2013/0042698 A1  Feb. 21, 2013

(30) Foreign Application Priority Data
May 3, 2010  (DE) .......................... 10 2010 028 475

(51) Int. Cl.
*G01F 1/708*  (2006.01)
*G01F 1/704*  (2006.01)
(52) U.S. Cl.
CPC .............. *G01F 1/708* (2013.01); *G01F 1/7044* (2013.01)
(58) Field of Classification Search
USPC ................................ 73/54.41, 861.18, 861.19
See application file for complete search history.

(56) References Cited

U.S. PATENT DOCUMENTS 3,776,033 A * 12/1973 Herzl ......................... 73/861.22
3,939,406 A    2/1976 Billeter et al.
(Continued)

FOREIGN PATENT DOCUMENTS

DE    21 33 393 C2    1/1972
DE    24 28 487 A1    1/1975
(Continued)

OTHER PUBLICATIONS

German Search Report in 10 2010 028 475.0, dated Feb. 2, 2011.
(Continued)

*Primary Examiner* — Jewel V Thompson
(74) *Attorney, Agent, or Firm* — Bacon & Thomas, PLL

(57) ABSTRACT

A method and an apparatus for determining at least one flow characteristic of an essentially laminarly flowing, gaseous or liquid medium in a pipeline. Distinguishing features include: that at least one modulation element introduced into, or placed in, the pipeline produces, at least for the case, in which the medium is flowing with a velocity different from zero, a change in density of the medium, at least at times, in the vicinity of the modulation element; that at least one mechanically oscillatable unit introduced into, or placed in, the pipeline and spaced from the modulation element is excited to resonant oscillations; that mechanical oscillations are received by the mechanically oscillatable unit and converted into an electrical, received signal, wherein the received signal is sensitive to the density change; and that the at least one flow characteristic of the medium is determined from the reaction of the received signal of the mechanically oscillatable unit to the density change.

14 Claims, 3 Drawing Sheets

(56) References Cited

U.S. PATENT DOCUMENTS

| | | | |
|---|---|---|---|
| 4,922,745 A | | 5/1990 | Rudkin et al. |
| 5,121,639 A | * | 6/1992 | McShane ............... 73/861.06 |
| 5,127,173 A | * | 7/1992 | Thurston et al. ............. 73/202 |
| 5,808,209 A | * | 9/1998 | Zielinska et al. ......... 73/861.22 |
| 2005/0005710 A1 | | 1/2005 | Sage, Jr. |
| 2009/0000393 A1 | | 1/2009 | Nyfors et al. |
| 2012/0144901 A1 | * | 6/2012 | Pfeiffer et al. ............. 73/54.41 |

FOREIGN PATENT DOCUMENTS

| | | |
|---|---|---|
| DE | 296 07 315 U1 | 8/1996 |
| DE | 10 2005 011 402 A1 | 9/2006 |
| DE | 10 2007 034 585 A1 | 1/2009 |
| EP | 0 127 790 A2 | 12/1984 |
| WO | 2007/074004 A1 | 7/2007 |
| WO | 2011138147 A1 | 11/2011 |

OTHER PUBLICATIONS

International Preliminary Report on Patentability in PCT/EP2011/055944, dated Nov. 6, 2012, and English translation thereof.

* cited by examiner

METHOD AND APPARATUS FOR DETERMINING FLOW CHARACTERISTICS OF A MEDIUM IN A PIPELINE

TECHNICAL FIELD

The present invention relates to a method for determining at least one flow characteristic of an essentially laminarly flowing, gaseous or liquid medium in a pipeline. The gaseous medium can equally be a gas or a gas mixture. The flow characteristic is, for example, flow velocity, flow direction, volume flow or mass flow, e.g. flow rates. The flow velocity to be determined can, in such case, also be zero, i.e. the medium at most performs a thermal movement. The medium flows, however, at least at times, laminarly.

BACKGROUND DISCUSSION

In the case of a large number of industrial processes, a gas, a gas mixture or a liquid flows through a pipeline. In order to be able to control and/or monitor the process, it is, among other things, necessary to know the flow velocity or the mass flow of the medium. A large number of different measuring principles and measuring devices for this purpose are known from the state of the art.

For small flow velocities, thermal flow sensors are frequently used. In a first variant, these comprise: a heating element for warming the medium flowing past, wherein this heating element is operated with constant heating power; and also two temperature sensors; wherein, in each case, one temperature sensor is arranged downstream from the heating element and one upstream from the heating element, and temperatures of the medium are registered. From the temperature difference determined with the two temperature sensors, the flow velocity can be ascertained. So called thermal anemometers are also known. In such case, a heating element is controlled to a constant temperature. The faster the medium flows past the heating element and, in such case, removes heat, the greater the heating power required for keeping the heating element at a constant temperature.

A disadvantage in the case of thermal flow sensors is that they are sensitive to accretions, which may form on them, and, as their lifetime increases, they exhibit a thermal drift. This necessitates frequent maintenance and/or renewed calibration.

Measuring devices based on the Coriolis principle are very reliable. These are essentially composed of at least one oscillatable pipe, which is inserted into a pipeline as an intermediate piece and, on the basis of the Coriolis effect, determines the flow velocity of the medium. Such measuring devices exist in a large number of embodiments and nominal diameters. A disadvantage of Coriolis measuring devices is the high initial investment that they require.

SUMMARY OF THE INVENTION

An object of the invention is to provide a method for reliably determining at least one flow characteristic of an essentially laminarly flowing medium, wherein such method is, moreover, implementable in a cost effective manner. Furthermore, a corresponding apparatus for performing the method is to be provided.

The object is achieved by features including that at least one modulation element introduced into the pipeline produces, at least for the case, in which the medium flows with a velocity different from zero, a change in density of the medium, at least at times, in the vicinity of the element; that at least one mechanically oscillatable unit introduced into the pipeline and spaced from the modulation element is excited to resonant oscillations; that mechanical oscillations are received by the mechanically oscillatable unit and converted into an electrical, received signal, wherein the received signal is sensitive to the density change; and that the at least one flow characteristic of the medium is determined from the reaction of the received signal of the mechanically oscillatable unit to the density change.

According to the invention, the density of the medium is influenced by a modulation element and the reaction of the mechanically oscillatable unit arranged at a certain distance from the modulation element is detected by evaluating the received signal. The modulation element influences the density, for example, via the temperature or the pressure of the medium. The determinable flow characteristics are the presence of a flow and the flow direction, and, depending on embodiment, the flow velocity, the volume flow and/or the mass flow.

The mechanically oscillatable unit is preferably an oscillatory fork, which comprises two paddles arranged on a membrane. It can, however, also be a single rod. Measuring devices with an oscillatory fork are known especially for fill level and density measurement. The special embodiment of the oscillatory fork for application in gaseous media is described, for example, in WO 2007074004 A1. There, it is provided, for example, that the product of the thickness and density of a paddle is as small as possible, and the surface area of a paddle is as large as possible. For further details, reference is made to the named document. For measuring, the oscillatory fork is excited to oscillate at its resonance frequency, and the mechanical oscillations are received and converted into an electrical, received signal. As a rule, at least one piezoelectric transducer serves both for excitation as well as also for reception. The resonance frequency changes as a function of the density of the medium surrounding the paddle. A change in the density of the medium is, consequently, detectable from a change in the resonance frequency. A density changed at times, or lastingly, via the modulation element provides information concerning whether the medium is at rest or flowing. Moreover, the flow velocity is determinable, for example, by a travel time measurement of a density fluctuation in the flowing medium caused by the modulation element.

If the flow direction of the medium is predetermined or known, a single mechanically oscillatable unit suffices for determining the flow velocity and the flow, e.g. flow rate. If the flow direction is, in contrast, not known, two oscillatable units are arranged symmetrically around the modulation element, so that, on the one hand, the flow direction can be determined, and, on the other hand, as a function of the flow direction, the flow velocity and/or the volume flow or mass flow can be measured with the one oscillatable unit or with the other. It is, of course, true that, in each case, the oscillatable unit arranged downstream from the modulation element is taken into consideration for evaluation with reference to the flow characteristic on the basis of the changed physical variable. Furthermore, it is possible to compare the received signals of the two oscillatable units and therefrom to ascertain the flow characteristic to be determined.

In a first embodiment of the solution of the invention, the pipe diameter is lessened by the modulation element. The modulation element is, in this case, a constricting element, which is placed on the pipe inner wall and does not degrade the laminar flow. If the medium at rest, no properties of the medium are changed thereby. If the medium is flowing, this modulation element leads to a pressure difference in front of and behind the modulation element along a longitudinal axis of the pipeline. Associated with this is a density difference, which is determined by two oscillatable units. For this, oscillatable units are introduced into the pipeline, one in the flow direction in front of, and one behind, the constricting element. This embodiment is suitable for gaseous media.

In an alternative embodiment, the temperature of the medium is changed in the vicinity of the modulation element via the modulation element. In the simplest case, a heating element is introduced into the pipeline as a modulation element. This embodiment is suitable for gaseous media and for a large number of liquid media.

In a further development of this embodiment, the modulation element is heated in a constant manner. If the modulation element is an electrical heating element, such element is supplied with a constant heating current for this purpose.

In an embodiment of the method, a difference in the oscillation frequencies of the first mechanically oscillatable unit and a second mechanically oscillatable unit is determined, wherein the first mechanically oscillatable unit and the second mechanically oscillatable unit are arranged along a longitudinal axis of the pipeline essentially symmetrically around the modulation element, and from the difference in the oscillation frequencies, the presence of a flow, the flow direction and/or the flow velocity of the medium are/is ascertained. Alternatively, the first and the second mechanically oscillatable units are not arranged symmetrically around the modulation element, but are instead arranged at different distances from one another. Preferably, the oscillatable units are introduced into the pipeline along a shared surface element of the pipeline.

In an embodiment, the modulation element is heated with a heating current which is variable as a function of time, so that a time-dependent change in the temperature of the medium is produced. In the environment of the modulation element embodied as the heating element, the medium is preferably periodically heated by the heating current which is variable as a function of time, and thus, a density change is brought about, which moves with the flowing medium, and which can be detected by the mechanically oscillatable unit. Naturally occurring temperature fluctuations are slower than those induced by the heating element. Those induced by the heating element are preferably brought about with a few hertz. In this way, the density fluctuations correlated with the induced temperature change are also detectable in the case of a non-constant temperature of the medium.

An embodiment of the method associated therewith provides that flow velocity and/or the volume flow of the medium are/is determined from the distance between the mechanically oscillatable unit and the modulation element and from the time difference between the produced change in the temperature of the medium and a change in the received signal of the oscillatable unit as a reaction to the change in the temperature of the medium flowing past. In a preferred further development, a second mechanically oscillatable unit is arranged along a longitudinal axis of the pipeline relative to the first oscillatable unit on the other side of the modulation element, and from the received signal of the first and second oscillatable units, it is determined whether the medium is flowing with a velocity different from zero and, in given cases, in which direction the medium is flowing. Depending on flow direction, the flow velocity is determined with the first or the second mechanically oscillatable unit.

An alternative form of embodiment provides that flow velocity and/or volume flow are/is determined from the distance d1, at which a second mechanically oscillatable unit is arranged in the pipeline from the first mechanically oscillatable unit between this first mechanically oscillatable unit and the modulation element, and from the time difference between the change in the temperature of the medium detected with the second oscillatable unit and the change in the temperature detected with the first oscillatable unit. In this way, the dependence of the measuring on the reaction time of the medium upon the change in the heating current is prevented, which makes the determining of the flow velocity simpler and more precise.

An advantageous further development of the method provides that the density of the medium is determined via the first mechanically oscillatable unit and/or the second mechanically oscillatable unit, and the mass flow is determined from the density and the flow velocity.

Furthermore, the object is achieved by an apparatus for determining at least one flow characteristic of an essentially laminarly flowing, gaseous or liquid medium in a pipeline. The solution includes features: that placed in the pipeline is at least one modulation element, which, at least for the case, in which the medium is flowing with a velocity different from zero, produces, at least at times, a change in density of the medium in the vicinity of the modulation element; that at least one mechanically oscillatable unit is placed in the pipeline spaced from the modulation element and executes resonant oscillations; that associated with the mechanically oscillatable unit is at least one electronics unit, which receives mechanical oscillations of the mechanically oscillatable unit and converts these into an electrical, received signal, wherein the received signal is sensitive to the density change; and that, from the reaction of the received signal of the mechanically oscillatable unit to the density change, the electronics unit determines the at least one flow characteristic of the medium.

In a first embodiment of the apparatus of the invention, as a modulation element, a constricting element is placed in the pipeline, which lessens the pipe diameter and produces a pressure gradient in a flowing medium. The constricting element functions, so to say, as a diaphragm.

In an alternative embodiment, as a modulation element, a heating element is placed in the pipeline, which effects a temperature change of the medium in the vicinity of the heating element. The heating element is heated in a constant manner or in a manner variable in time.

An embodiment of the apparatus provides that a second mechanically oscillatable unit is placed in the pipeline in such a manner that the first oscillatable unit and the second oscillatable unit are arranged along a longitudinal axis of the pipeline essentially symmetrically around the modulation element. Alternatively, the second oscillatable unit is arranged at a distance from the modulation element, wherein this distance is different from the distance, at which the first oscillatable unit is arranged relative to the modulation element. In each case, the two oscillatable units are arranged in such a manner that in each case, one oscillatable unit is located in front of and one behind the modulation element relative to the flow direction. This enables the determining of the flow direction, and the determining of further flow characteristics in the case of different flow directions.

In an additional embodiment, at least one additional mechanically oscillatable unit is arranged between the modulation element and the first mechanically oscillatable unit and/or between the modulation element and the second mechanically oscillatable unit. On the whole, two or four oscillatable units are thus placed in the pipeline, wherein, in each case, two are arranged, in flow the direction, after the modulation element. In the case of known flow direction, only two oscillatable units are required.

Embodiments of the method for determining at least one flow characteristic associated with the embodiments of the apparatus are described in connection with the method. The respective method is performed in the electronics unit.

BRIEF DESCRIPTION OF THE DRAWINGS

The apparatus of the invention and the method of the invention will now be explained in greater detail on the basis of the appended drawing, the figures of which in each case show schematically as follows.

DETAILED DISCUSSION IN CONJUNCTION WITH THE DRAWINGS

Figure 1:
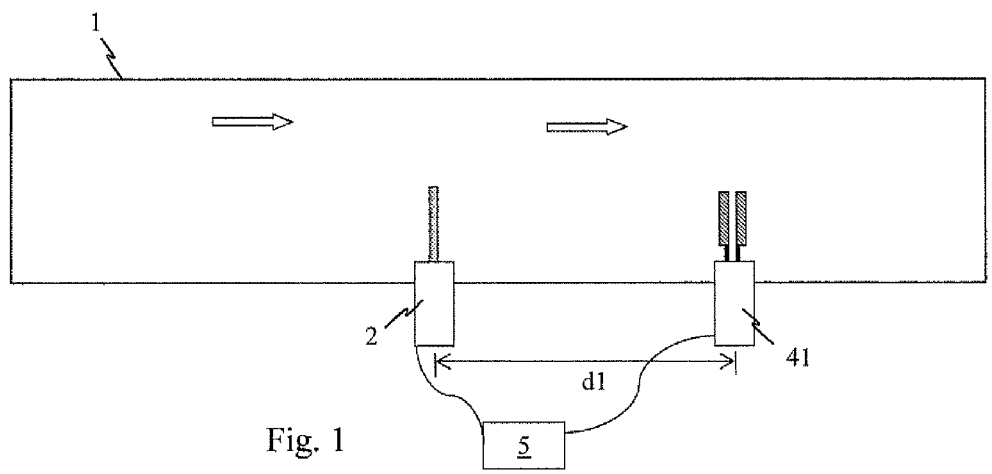
FIG. 1 is a pipeline with one heating element and one mechanically oscillatable unit.

FIG. 1 shows a simple construction, with which, according to the method of the invention, the flow velocity of a gaseous medium can be determined in the case of known flow direction. The method is equally applicable in the case of liquids, to the extent that their density exhibits a high temperature dependence. Examples of such liquids are gasoline and benzene. In order to assure a reliable measuring, the medium should flow essentially laminarly. In this example, the medium flows from left to right through the pipeline 1, as is indicated by the arrows. For modulating the density of the medium, a heating element 2 is introduced into the pipeline. The heating element can, in such case, protrude into the pipeline, or can be arranged essentially flatly on the wall in the interior of the pipeline. The heating element is, for example, a helically shaped wire or a platinum resistor mounted with thin film or thick film technology on a substrate. Each case represents a heating element, which reacts rapidly to changes in the heating current, so that the current temperature of the heating element is relatively precisely controllable.

Arranged after the heating element in the flow direction at a distance d1 from the heating element is a mechanically oscillatable unit 41. The mechanically oscillatable unit 41 is in this preferred form of embodiment a so called oscillatory fork with two paddles, whose area and density are matched to the application in gaseous media. In order to achieve a sufficiently high sensitivity of the gas density measurement, the paddles have a large area and are very light. Usually, the sensitivity S of oscillatory forks suitable for gas measuring lies in the range of 5-10 cm³/g. Alternatively, the oscillatable unit is a so called single rod, which is known for the fill level measurement of bulk goods. Also the single rod is matched, for example, in its area and its mass—as well as via frequency matched compensation elements in the interior of the single rod—to the gas and/or liquid measurement.

The determining of the at least one flow characteristic occurs in an electronics unit 5, which is connected with the heating element and with the oscillatable unit. Preferably, this involves, in such case, a microprocessor. The oscillatable unit can have its own electronics unit, which serves for controlling the excitation and for processing the received signals.

The heating element at times produces a temperature increase ΔT of the medium surrounding the heating element. Associated with this is a reduction in the density of the medium. The resonance frequency of the oscillatable unit is dependent on the density of the medium surrounding it, so that a density change in the medium resulting from the heating element is recognizable in the received signal of the oscillatable unit after a certain length of time lt, which depends on the distance d1 and the flow velocity v of the medium. This is true for all gases and for liquids whose temperature coefficient is sufficiently high. The method is thus especially suitable for gases. For a gaseous medium, the frequency change ΔF resulting from the density change with reference to the oscillation frequency $F_0$ is given in the case of an average temperature $$T = T_0 + \frac{\Delta T}{2}$$

by the following equation:

$$\frac{\Delta F}{F_0} = \sqrt{\frac{1}{1+S \cdot \rho_0 \frac{T_0}{T_0+\Delta T}}} - \sqrt{\frac{1}{1+S \cdot \rho_0}}$$

wherein S is the sensitivity of the oscillatory fork and $\rho_0$ is the gas density at temperature $T_0$.

The smaller the density of the medium, the higher the sensitivity of the oscillatory fork must be, in order to produce a particular frequency difference in the case of predetermined temperature difference. The medium should flow essentially laminarly, so that it is assured that no turbulence occurs, which equalizes the temperature related density fluctuations.

In order to calculate the flow velocity, the length of time lt is ascertained from a comparison of the heating current or the heating power and the frequency curve. For example, the time span between a rising edge in the heating current and a rising edge in the frequency of the oscillatable unit is determined. The flow velocity of gases of average weight such as oxygen, nitrogen or carbon dioxide can be determined with an oscillatory fork embodied for density measurement in gas in the case of standard pressure by means of a temperature increase of about 0.1-0.2 K. In the case of light gases, such as, for example, hydrogen, helium or methane, an oscillatory fork with a higher sensitivity or an increased process pressure is necessary.

In an advantageous embodiment, the heating element is heated with a sinusoidal heating current. Correspondingly impressed onto the medium flowing past the heating element is a sinusoidal temperature and density profile, which, however, has a certain phase shift with respect to the sine of the heating current. The frequency curve of the oscillations of the oscillatable unit is likewise sinusoidal, wherein, because of the gas transport, another phase shift with respect to the sine of the heating current occurs. This phase shift is a measure for evaluating the flow velocity. In order to be able exactly to determine the flow velocity v from the distance d1 and time dt, the delay t1 between the production of the temperature change of the heating element and the occurrence of the temperature or density change of the medium must be known or be negligibly small. The known delay t1 is then subtracted from the ascertained length of time lt.

Especially in the case of a sinusoidal periodic heating current, this embodiment of the measuring method is only applicable when the length of time lt between the production of the temperature change and the registering of the density change is smaller than the period of the oscillation. The frequency of the heating current, as well as the distance d1 are, consequently, to be selected corresponding to the flow velocities to be expected. For example, in the case of a sine-like temperature fluctuation of 5 Hz and a distance d1 of 50 cm, flow velocities up to a maximum of 2.5 m/sec are measurable. Consequently, in the case of high flow velocities, preferably no periodic temperature fluctuations are brought about, but instead, the temperature is changed for a short time at particular intervals, and the received signal of the oscillatable unit is evaluated relative to correlated frequency changes. Alternatively, the amplitude of the periodic temperature fluctuations can be varied, for example, by each x-th maximum being twice as high as the others. In this way, a phase shift is also recognizable, which is greater than $2\pi$, wherein the maximum detectable phase shift depends on the choice of x.

Preferably, other variables are determined besides the flow velocity. For example, in the case of a known pipe diameter, from the flow velocity v, or from the distance d1 and the length of time lt, the volume flow rate $Q_V$ is determinable.

From the averaged oscillation frequency $$F = F_0 + \frac{\Delta F}{2},$$

at the average temperature T, a reference frequency $F_{vac}$ of the oscillation in a vacuum in the case of the average temperature T, and the sensitivity S of the oscillatable unit, the density of the medium, $\rho$, is determinable according to $$\rho = \frac{1}{S}\left(\frac{F_{vac}^2}{F^2} - 1\right).$$

With this, the mass flow rate $Q_M$ of the medium is furthermore determinable as product of volume flow rate $Q_V$ and density $\rho$.

The sensitivity S and the reference frequencies for different average temperatures are stored, for example, in a control/evaluation unit, e.g. a microcontroller, belonging to the oscillatable unit. Alternatively, these parameters, like the application-specific data such as pipe diameter D and distance d1, are stored in the electronics unit, which determines the flow characteristics.

Figure 2:
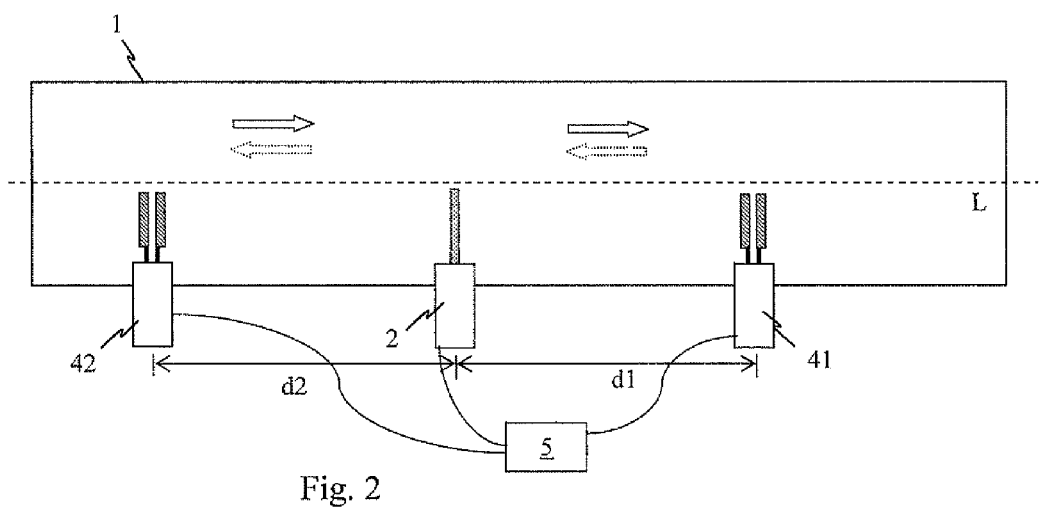
FIG. 2 is a pipeline with two mechanically oscillatable units arranged symmetrically around a heating element.

FIG. 2 shows a measuring arrangement for performing the method described for FIG. 1 for the case in which the flow direction is not known or is variable, or it is not known whether the medium is flowing at all. The measuring is enabled by oscillatable units 41 and 42 being introduced into the pipeline on both sides of the heating element 2. The distance d2, at which the second oscillatable unit 42 is arranged spaced from the heating element 2, preferably equals the distance d1, which the first oscillatable unit 41 has from heating element. The distances d1 and d2 can, however, also differ. As a function of the flow direction, the distance d1 or d2 is then correspondingly to be taken into consideration for calculation of the flow velocity. In order to prevent the formation of turbulence, the heating element, the first oscillatable unit and the second oscillatable unit are arranged on a shared surface element of the pipeline. Provided that laminar flow can be assured, an offset arrangement is also possible.

For detecting whether the medium is flowing or essentially just sitting in the pipeline, the exciter signal of the heating element—for example, the heating current—and the received signals of the first oscillatable unit and the second oscillatable unit—or only the two latter signals—are compared with one another. If is the temperature of the heating element changed, but, as a result of this, a frequency change occurs neither in the case of the first oscillatable unit nor in the case of the second oscillatable unit, the medium is not flowing, but, instead, at most, performs thermal movements. If, in contrast, the frequency of the oscillation of the first oscillatable unit or the second oscillatable unit changes, and this change is correlated with a change in the temperature of the heating element, the medium is flowing in the direction of that osciliatable unit, whose oscillation frequency has changed. The determining of flow velocity, volume and/or mass flow then occurs with the oscillatable unit arranged in the flow direction after the heating element.

With the arrangement illustrated in FIG. 2, flow characteristics can also be determined in another way. For this, the heating element is heated with a constant heating current, so that the surrounding medium is heated not only at times, but instead constantly. For determining the flow characteristics of the medium, the difference in the oscillation frequencies of the first oscillatable unit and the second oscillatable unit arranged symmetrically around the heating element is formed. If the medium is not flowing, with time, a homogeneous temperature of the medium sets in. Temperature and density of the medium are then equal in the environments of both mechanically oscillatable units. If the frequency difference between the first oscillatable unit and the second oscillatable unit is determined, one detects only a manufacturing related difference in the resonance frequencies. If, in contrast, the medium is flowing through the pipeline with a velocity different from zero, the medium heats up when passing the heating element, so that the oscillatable unit arranged downstream measures a temperature related density smaller than the oscillatable unit arranged upstream. The frequency difference between the two osciliatable units then includes, besides the manufacturing related contribution, an additional term, the sign of which reflects the flow direction. The temperature increase in the medium flowing past produced by the heating element amounts, for example, to 0.1-0.2 K.

In principle, this measuring method is suited for all gases. In order to be able to measure reliably, a minimum density of about one milligram per cubic centimeter or a process pressure of about one bar is necessary. In the case of light gases such as hydrogen or helium, a higher process pressure of, for example, 5 bar and above, and/or a higher sensitivity of the oscillatable unit are/is required. Furthermore, the measuring method is applicable for liquids with a strongly temperature dependent density by using an oscillatable unit optimized for liquids.

Figure 3:
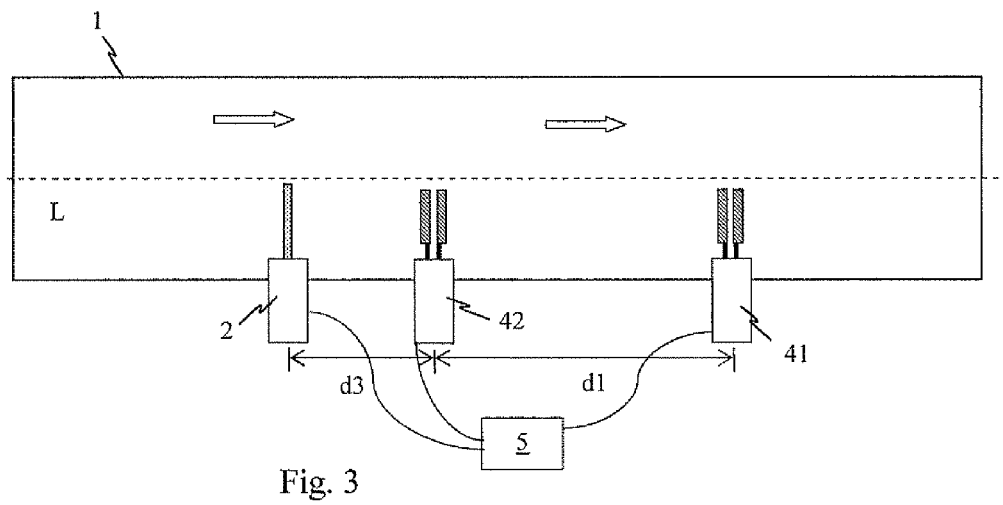
FIG. 3 is a pipeline with two mechanically oscillatable units arranged on the same side of a heating element.

FIG. 3 shows an arrangement, with which the flow characteristics of the medium are determinable in manner similar to that described in connection with FIG. 1. For this, the heating element likewise produces a variable temperature or density profile in the flowing medium. In contrast to the already described embodiment, however, the exciter signal of the heating element is not compared with the received signal of the oscillatable unit, but instead, a second oscillatable unit 42 is introduced into the pipeline between the heating element and the first oscillatable unit, and the received signals of the two oscillatable units are compared with one another. The distance d1 of the first oscillatable unit from the second oscillatable unit preferably corresponds, in such case, to the distance of the first oscillatable unit from the heating element in the first example of an embodiment. The distance d3 between the second oscillatable unit 42 and the heating element 2 is less than d1.

The advantage of comparing the two frequency curves is, on the one hand, that two signals of the same type are compared with one another, which makes the evaluation especially simple. On the other hand, the length of time lt between the reaction of the second oscillatable unit and the reaction of the first oscillatable unit to the changed density, which is dependent on the flow velocity, is independent of the delay, which exists between excitation of the temperature change in the heating element and the temperature change actually taking place in the medium. The flow velocity is determined here directly from the distance d1 and the ascertained length of time lt. The remaining variables are calculated according to the method already described.

Figure 3A:
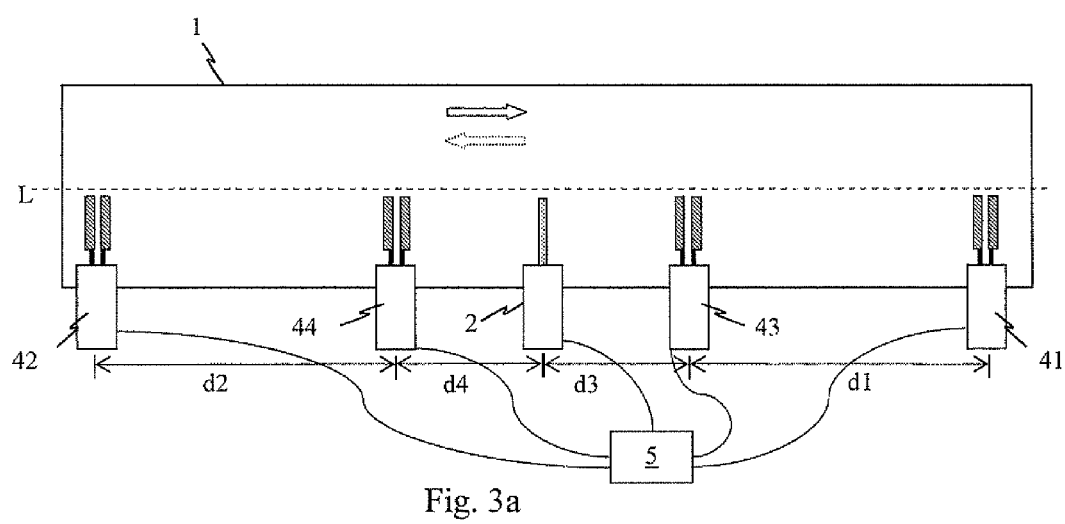
FIG. 3a is a flow direction independent development of FIG. 3.

In connection with this embodiment, it is likewise possible to introduce a third oscillatable unit 43 and a fourth oscillatable unit 44 into the pipeline, in the flow direction, in front of the heating element, symmetrically to the first oscillatable unit and the second oscillatable unit. Via such an arrangement, the flow characteristics of the medium can also be determined with this method in the case of a variable or unknown flow direction. Such a construction is shown in FIG. 3a. The distances d1 and d2 or d3 and d4 can, in such case, also be different. In the calculation of the flow velocity, d1 or d2 is then to be used, depending on the flow direction.

Figure 4:
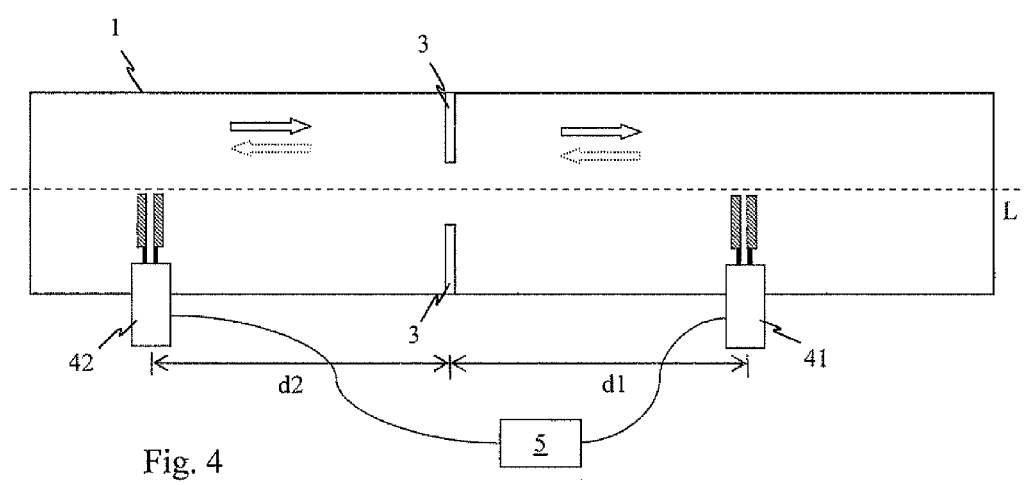
FIG. 4 is a pipeline with a constricting element and two mechanically oscillatable units.

FIG. 4 shows another form of embodiment of the apparatus of the invention with a constricting element 3 effecting a narrowing of the pipeline. In the simplest case, the constricting element is an annular diaphragm. A first mechanically oscillatable unit and a second mechanically oscillatable unit are introduced into the pipeline essentially symmetrically around the constricting element. Preferably, the two oscillatable units are arranged on a shared surface element. An offset arrangement and/or a positioning at different distances from the constricting element are, however, likewise possible. This apparatus is applicable in the case of all gaseous media. The constricting element leads after a particular minimum velocity of the gaseous medium after the constricting element to a pressure gradient, and thereby to a density gradient detectable according to the invention. The faster the medium flows, the higher the difference between the density at the site of the first oscillatable unit and the density at the site of the second oscillatable unit. For determining the flow velocity, the difference between the oscillation frequencies of the two mechanically oscillatable units is considered analogously to the method described for FIG. 2. Since the density change occurs as a result of a pressure change, the temperature dependence of the medium on the density plays a lesser role, so that this measuring method is applicable for all gases. Depending on the flow direction, the density dependent term in the difference bears a positive or negative sign.

The invention claimed is:

1. A method for determining at least one flow characteristic of an essentially laminarly flowing, gaseous or liquid medium in a pipeline, comprising the steps of:
   producing from at least one modulation element introduced into the pipeline at least in the case that the medium flows with a velocity different from zero, at least temporarily, a change in density of the medium, in the vicinity of the element;
   exciting at least one mechanically oscillatable unit introduced into the pipeline spaced from the modulation element to resonant oscillations;
   receiving mechanical oscillations by the mechanically oscillatable unit and converting the oscillations into an electrical, received signal, wherein the received signal is sensitive to the density change; and
   determining the at least one flow characteristic of the medium from the reaction of the received signal of the mechanically oscillatable unit to the density change.

2. The method as claimed in claim 1, wherein:
   the pipe diameter is lessened by the modulation element.

3. The method as claimed in claim 1, wherein:
   the temperature of the medium is changed in the vicinity of the modulation element via the modulation element.

4. The method as claimed in claim 3, wherein:
   the modulation element is heated in an essentially constant manner.

5. The method as claimed in claim 2, wherein:
   a difference in the oscillation frequencies of the first mechanically oscillatable unit and a second mechanically oscillatable unit is determined; and
   the first mechanically oscillatable unit and the second mechanically oscillatable unit are arranged along a longitudinal axis of the pipeline essentially symmetrically around the modulation element, and presence of a flow, a flow direction and/or a flow velocity of the medium are/is ascertained from the difference in the oscillation frequencies.

6. The method as claimed in claim 3, wherein:
   the modulation element is heated with a heating current which is variable as a function of time, so that a time-dependent change in the temperature of the medium is produced.

7. The method as claimed in claim 6, wherein:
   the flow velocity and/or the volume flow of the medium are/is determined from the distance between the mechanically oscillatable unit and the modulation element and from the time difference between the produced change in the temperature of the medium and a change in the received signal of the oscillatable unit as a reaction to the change in the temperature of the medium flowing past.

8. The method as claimed in claim 6, wherein:
   the flow velocity and/or the volume flow are/is determined from the distance, at which a second mechanically oscillatable unit is arranged from the first mechanically oscillatable unit between said first mechanically oscillatable unit and the modulation element in the pipeline, and from the time difference between the change in the temperature of the medium detected with the second oscillatable unit and the change in the temperature detected with the first oscillatable unit.

9. The method as claimed in claim 5, wherein:
   the density of the medium is determined via the first mechanically oscillatable unit and/or the second mechanically oscillatable unit, and the mass flow is determined from the density and the flow velocity.

10. An apparatus for determining at least one flow characteristic of an essentially laminarly flowing, gaseous or liquid medium in a pipeline, comprising:
    at least one modulation element, placed in a pipeline produces at least in the case that the medium is flowing with a velocity different from zero, at least temporarily, a change in density of the medium in the vicinity of said at least one modulation element;
    at least one mechanically oscillatable unit is placed in the pipeline spaced from said at least one modulation element which executes resonant oscillations; and;
    at least one electronics unit, is associated with said at least one mechanically oscillatable unit, which receives mechanical oscillations of said at least one mechanically oscillatable unit and converts these into an electrical, received signal, whereas:

the received signal is sensitive to the density change; and, which said at least electronics unit determines the at least one flow characteristic of the medium from a reaction of the received signal of said at least one mechanically oscillatable unit to the density change.

11. The apparatus as claimed in claim 10, wherein:
as said at least one modulation element, a constricting element is placed into the pipeline, which lessens the pipe diameter and produces a pressure gradient in a flowing medium.

12. The apparatus as claimed in claim 10, wherein:
as said at least one modulation element, a heating element is placed in the pipeline, which effects a temperature change of the medium in the vicinity of said heating element.

13. The apparatus as claimed in claim 10, further comprising:
a second mechanically oscillatable unit placed in the pipeline in such a manner that said first oscillatable unit and said second oscillatable unit are arranged along a longitudinal axis of the pipeline essentially symmetrically around said at least one modulation element.

14. The apparatus as claimed in claim 10, further comprising:
at least one additional mechanically oscillatable unit is arranged between said at least one modulation element and said first mechanically oscillatable unit and/or between said at least one modulation element and said second mechanically oscillatable unit.

* * * * *